United States Patent
Cui et al.

(10) Patent No.: US 10,017,617 B2
(45) Date of Patent: *Jul. 10, 2018

(54) PEROXIDE TREATED METALLOCENE-BASED POLYOLEFINS WITH IMPROVED MELT STRENGTH

(71) Applicant: Chevron Phillips Chemical Company LP, The Woodlands, TX (US)

(72) Inventors: Lili Cui, Bartlesville, OK (US); Ashish M. Sukhadia, Bartlesville, OK (US); Vivek Rohatgi, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,527

(22) Filed: Jul. 7, 2017

(65) Prior Publication Data

US 2017/0306114 A1     Oct. 26, 2017

Related U.S. Application Data

(60) Continuation of application No. 15/134,464, filed on Apr. 21, 2016, now Pat. No. 9,732,197, which is a division of application No. 13/893,516, filed on May 14, 2013, now Pat. No. 9,346,897.

(51) Int. Cl.

| | | |
|---|---|---|
| *C08J 5/18* | (2006.01) | |
| *C08F 210/16* | (2006.01) | |
| *B29C 47/00* | (2006.01) | |
| *C08F 10/02* | (2006.01) | |
| *B29C 49/00* | (2006.01) | |
| *B29C 39/00* | (2006.01) | |
| *B29C 47/40* | (2006.01) | |
| *B29C 47/38* | (2006.01) | |
| *C08F 8/00* | (2006.01) | |
| *C08K 5/14* | (2006.01) | |
| *B29L 7/00* | (2006.01) | |
| *B29K 105/00* | (2006.01) | |
| *B29K 23/00* | (2006.01) | |

(52) U.S. Cl.
CPC ............. *C08J 5/18* (2013.01); *B29C 39/003* (2013.01); *B29C 47/0004* (2013.01); *B29C 47/0021* (2013.01); *B29C 47/0026* (2013.01); *B29C 47/0057* (2013.01); *B29C 47/385* (2013.01); *B29C 47/40* (2013.01); *B29C 49/0005* (2013.01); *C08F 8/00* (2013.01); *C08F 10/02* (2013.01); *C08F 210/16* (2013.01); *C08K 5/14* (2013.01); *B29K 2023/0625* (2013.01); *B29K 2023/0658* (2013.01); *B29K 2023/08* (2013.01); *B29K 2105/0085* (2013.01); *B29K 2105/0094* (2013.01); *B29K 2995/0088* (2013.01); *B29L 2007/008* (2013.01); *C08F 2810/10* (2013.01); *C08J 2323/04* (2013.01); *C08J 2323/06* (2013.01); *C08J 2323/08* (2013.01); *C08J 2323/26* (2013.01)

(58) Field of Classification Search
CPC .... C08F 8/00; C08F 8/06; C08F 10/02; C08F 210/16; C08J 2323/04; C08J 2323/06; C08J 2323/08; C08J 2323/26; C08J 3/24; C08J 5/18; C08K 5/14; B29C 47/0026; B29C 47/0057; B29C 49/0005
USPC ........ 525/387, 333.8; 526/348, 348.5, 348.1, 526/348.2
See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood |
| 4,501,885 A | 2/1985 | Sherk et al. |
| 4,588,790 A | 5/1986 | Jenking, III et al. |
| 4,794,096 A | 12/1988 | Ewen |
| 4,808,561 A | 2/1989 | Welborn |
| 5,221,570 A | 6/1993 | Gokcen et al. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,576,259 A | 11/1996 | Hasegawa |
| 5,756,203 A | 5/1998 | Shirodkar |
| 5,807,938 A | 9/1998 | Kaneko |
| 5,919,983 A | 7/1999 | Rosen |
| 6,114,486 A | 9/2000 | Rowland et al. |
| 6,143,854 A | 11/2000 | Bamberger et al. |
| 6,187,423 B1 | 2/2001 | Maeger et al. |
| 6,239,235 B1 | 5/2001 | Hottovy et al. |
| 6,262,191 B1 | 7/2001 | Hottovy et al. |
| 6,448,341 B1 | 9/2002 | Kolthammer et al. |

(Continued)

FOREIGN PATENT DOCUMENTS

| | | |
|---|---|---|
| WO | WO 2011/037971 | 3/2011 |
| WO | WO 2013/033328 | 3/2013 |
| WO | WO 2013/056466 | 4/2013 |

OTHER PUBLICATIONS

Bird, et al., entitled "Dynamics of Polymeric Liquids, Volume 1, Fluid Mechanics," 2nd Edition, John Wiley & Sons (1987), 3 pages.

(Continued)

*Primary Examiner* — Roberto Rabago
(74) *Attorney, Agent, or Firm* — Merchant & Gould P.C.

(57) ABSTRACT

Disclosed herein are ethylene-based polymers having low densities and narrow molecular weight distributions, but high melt strengths for blown film processing. Such polymers can be produced by peroxide-treating a metallocene-catalyzed resin.

25 Claims, 4 Drawing Sheets

(56) References Cited

U.S. PATENT DOCUMENTS

| | | | |
|---|---|---|---|
| 6,644,356 | B1 | 11/2003 | Connor et al. |
| 6,833,415 | B2 | 12/2004 | Kendrick et al. |
| 7,041,617 | B2 | 5/2006 | Jensen et al. |
| 7,220,801 | B2 | 5/2007 | Dunaway |
| 7,226,886 | B2 | 6/2007 | Jayaratne et al. |
| 7,294,599 | B2 | 11/2007 | Jensen et al. |
| 7,517,939 | B2 | 4/2009 | Yang et al. |
| 7,601,665 | B2 | 10/2009 | McDaniel et al. |
| 7,619,047 | B2 | 11/2009 | Yang et al. |
| 7,632,573 | B2 | 12/2009 | Ohlsson et al. |
| 7,863,210 | B2 | 1/2011 | Murray et al. |
| 7,884,163 | B2 | 2/2011 | McDaniel et al. |
| 7,919,639 | B2 | 4/2011 | Murray et al. |
| 8,012,900 | B2 | 9/2011 | Murray et al. |
| 8,080,681 | B2 | 12/2011 | Murray et al. |
| 8,114,946 | B2 | 2/2012 | Yang et al. |
| 8,329,834 | B2 | 12/2012 | Masino et al. |
| 8,771,816 | B2 | 7/2014 | DesLauriers et al. |
| 9,346,897 | B2 * | 5/2016 | Cui ............... B29C 39/003 |
| 9,732,197 | B2 | 8/2017 | Cui et al. |
| 2007/0179044 | A1 * | 8/2007 | Yang ............... C08F 10/00 502/103 |
| 2008/0118692 | A1 * | 5/2008 | McLeod ............ B29D 23/001 428/36.92 |
| 2008/0161526 | A1 | 7/2008 | Guenther et al. |
| 2011/0171450 | A1 | 7/2011 | Berthold |
| 2011/0318559 | A1 | 12/2011 | Berthold |
| 2012/0065335 | A1 * | 3/2012 | Kipke ............... C08L 23/04 525/240 |
| 2013/0319131 | A1 | 12/2013 | Inn et al. |
| 2013/0325363 | A1 | 12/2013 | DesLauriers et al. |
| 2015/0065669 | A1 | 3/2015 | Hlavinka et al. |

OTHER PUBLICATIONS

Cotton et al., Advanced Inorganic Chemistry, 6th Ed., Wiley-Interscience, 1999, 4 pages.

DesLauriers et al., entitled "*Quantifying short chain branching microstructures in ethylene 1-olefin copolymers using size exclusion chromatography and Fourier transform infrared spectroscopy (SEC-FTIR),*" Polymer, 2002, 43, pp. 159-170.

Doerpinghaus, entitled "*Separating the effects of sparse long-chain branching on rheology from those due to molecular weight in polyethylenes,*" J. Rheology, vol. 47(3), p. 717-736, May 2003.

*Film Extrusion Manual—Process, Materials, Properties,* TAPPI Press, 1992, 16 pages.

*Hawley's Condensed Chemical Dictionary,* 11th Ed., John Wiley & Sons, 1995, 3 pages.

Hieber et al., entitled "*Shear-Rate-Dependence Modeling of Polymer Melt Viscosity,*" Polymer Engineering and Science, 1992, 32(14), pp. 931-938.

Hieber et al., entitled "*Some correlations involving the shear viscosity of polystyrene melts,*" Rheologica Acta, 1989, 28, pp. 321-332.

International Search Report for PCT/US2014/037664 dated Sep. 25, 2014.

Janzen et al., entitled "*Diagnosing Long-Chain Branching in Polyethylenes,*" published in the Journal of Molecular Structure, (1999), pp. 485-486 and 569-584, 20 pages.

Karjala, entitled "*Detection of Low Levels of Long-Chain Branching in Polydisperse Polyethylene Materials,*" J. Applied Polymer Science, vol. 119, p. 636-646, Jan. 15, 2011.

Krishnaswamy, entitled "*Tensile Properties of Linear Low Density Polyethylene (LLDPE) Blown Films,*" Polymer Engineering and Science, vol. 40 (11), p. 2385-2396, Nov. 2000.

Krupa et al, entitled "*Thermal and Mechanical Properties of LLDPE Cross-Linked with Gamma Radiation,*" Elsevier, Polymer Degradation and Stability 71 (2001) pp. 361-366.

*Modern Plastics Encyclopedia,* Mid-Nov. 1995 Issue, vol. 72, No. 12, 3 pages.

Wyatt, Philip J., entitled "*Light Scattering and the Absolute Characterization of Macromolecules,*" published in Analytica Chimica Acta, 272 (1993), pp. 1-40.

Yu et al., entitled "*Long Chain Branches in Metallocene-Catalyzed Polyethylene Determined by a Combination of SEC/Multi-Angle Light Scattering, NMR and Rheology,*" published in Polymer Preprints, 2003, 44(2), 49, 2 pages.

Third Party Observations in JP Patent Application No. 2016-514005, dated Sep. 8, 2017, 5 pages.

\* cited by examiner

PEROXIDE TREATED METALLOCENE-BASED POLYOLEFINS WITH IMPROVED MELT STRENGTH

REFERENCE TO RELATED APPLICATIONS

This application is a continuation application of U.S. patent application Ser. No. 15/134,464, filed on Apr. 21, 2016, now U.S. Pat. No. 9,732,197, which is a divisional application of U.S. patent application Ser. No. 13/893,516, filed on May 14, 2013, now U.S. Pat. No. 9,346,897, the disclosures of which are incorporated herein by reference in their entirety.

BACKGROUND OF THE INVENTION

In various thick gauge film applications for linear low density polyethylene (LLDPE) resins, such as geomembrane applications, melt strength for blown film processing and bubble stability can be important. Additionally, the density of the LLDPE resin can be reduced for improved flexibility of the film, however the reduction in density can adversely affect the stiffness and maximum use temperature (e.g., softening and/or melting temperature) of the film.

It would be beneficial to produce LLDPE resins having good melt strength and sufficient flexibility after converting into a film, without sacrificing the maximum use temperature and stiffness of the film. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymers (e.g., ethylene/α-olefin copolymers) which can have a ratio of Mw/Mn of less than or equal to about 5, a ratio of Mz/Mw of less than or equal to about 2.3, and a zero-shear viscosity at 190° C. of greater than or equal to about $8 \times 10^4$ Pa-sec. In further aspects, these ethylene polymers can have a melt index in a range from 0 to about 2, and/or a ratio of HLMI/MI in a range from about 15 to about 50, and/or a density in a range from about 0.895 to about 0.928 g/cm$^3$, and/or a ratio of Mw/Mn in a range from about 2 to about 5, and/or a ratio of Mz/Mw in a range from about 1.5 to about 2.3, and/or a Mw in a range from about 75,000 to about 250,000 g/mol, and/or a Mn in a range from about 10,000 to about 70,000 g/mol, and/or a Mz in a range from about 175,000 to about 300,000 g/mol, and/or a zero-shear viscosity at 190° C. in a range from about $1 \times 10^5$ to about $1 \times 10^6$ Pa-sec, and/or a CY-a parameter at 190° C. in a range from about 0.08 to about 0.28, and/or from about 0.008 to about 0.04 long chain branches (LCB) per 1000 total carbon atoms, and/or a peak melting point in a range from about 100 to about 120° C., and/or a vicat softening temperature in a range from about 95 to about 110° C., and/or a difference between the peak melting point and the vicat softening temperature of less than or equal to about 16° C., and/or a reverse comonomer distribution. These ethylene polymers can be used to produce various articles of manufacture, such as blown films and cast films.

Processes for producing these ethylene polymers using a base resin and a peroxide compound also are disclosed herein. Typically, the base resin can be produced using a metallocene-based catalyst system and can be characterized by a narrow molecular weight distribution.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
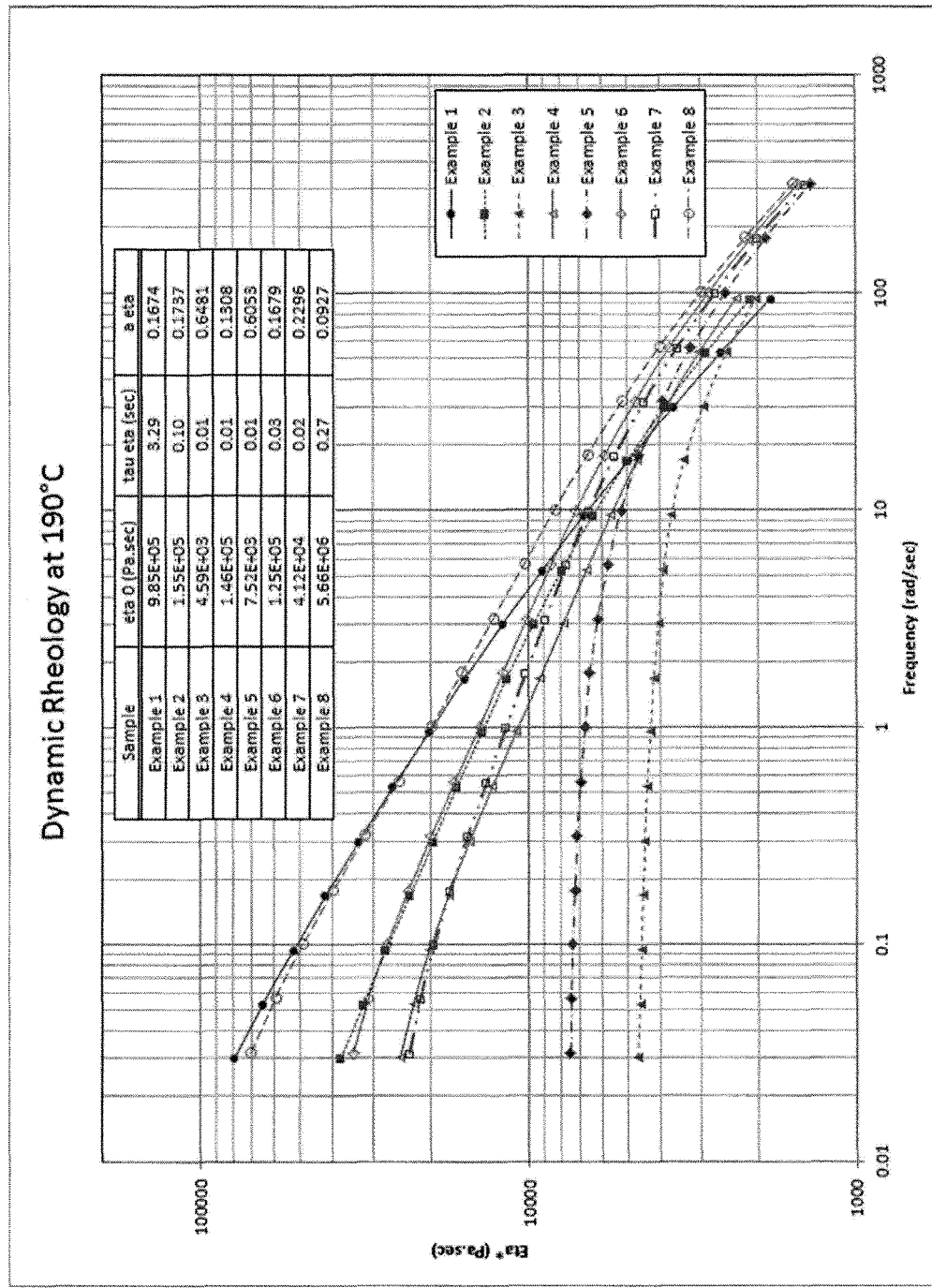
FIG. 1 presents a dynamic rheology plot (viscosity versus shear rate) at 190° C. for the polymers of Examples 1-8.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer.

In like manner, the scope of the term "polymerization" includes homopolymerization, copolymerization, terpolymerization, etc. Therefore, a copolymerization process could involve contacting one olefin monomer (e.g., ethylene) and one olefin comonomer (e.g., 1-hexene) to produce a copolymer.

The term "metallocene," as used herein, describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

The terms "catalyst composition," "catalyst mixture," "catalyst system," and the like, do not depend upon the actual product or composition resulting from the contact or reaction of the initial components of the catalyst composition/mixture/system, the nature of the active catalytic site, or the fate of the co-catalyst, the metallocene compound(s), any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, are used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety or compound having a certain number of carbon atoms, Applicants' intent is to disclose or claim individually every possible number that such a range could encompass, consistent with the disclosure herein. For example, the disclosure that a compound is a $C_3$ to $C_{18}$ olefin, or in alternative language, an olefin having from 3 to 18 carbon atoms, as used herein, refers to a compound that can be selected independently from an olefin having 3, 4, 5, 6, 7, 8, 9, 10, 11, 12, 13, 14, 15, 16, 17, or 18 carbon atoms, as well as any range between these two numbers (for example, a $C_4$ to $C_{10}$ olefin), and also including any combination of ranges between these two numbers (for example, a $C_3$ to $C_8$ and a $C_{12}$ to $C_{16}$ olefin).

Similarly, another representative example follows for the number-average molecular weight (Mn) of an ethylene polymer consistent with an aspect of this invention. By a disclosure that the Mn can be in a range from about 30,000 to about 70,000 g/mol, Applicants intend to recite that the Mn can be equal to about 30,000, about 35,000, about 40,000, about 45,000, about 50,000, about 55,000, about 60,000, about 65,000, or about 70,000 g/mol. Additionally, the Mn can be within any range from about 30,000 to about 70,000 (for example, from about 35,000 to about 65,000), and this also includes any combination of ranges between about 30,000 and about 70,000 (for example, the Mn can be in a range from about 30,000 to about 45,000, or from about 50,000 to about 65,000). Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

As used herein, "MD" refers to the machine direction, and "CD" refers to the cross direction. The cross direction also can be referred to herein as the transverse direction (TD). Various polymer and film properties are discussed throughout this disclosure. Following is a listing of these properties and their corresponding analytical test procedures and conditions:

Melt index (MI, g/10 min) was determined in accordance with ASTM D1238 condition F at 190° C. with a 2.16 Kg weight. High load melt index (HLMI, g/10 min) was determined in accordance with ASTM D1238 condition E at 190° C. with a 21.6 Kg weight. Polymer density was determined in grams per cubic centimeter (g/cc or g/cm³) on a compression molded sample, cooled at about 15° C. per minute, and conditioned for about 40 hours at 23° C. in accordance with ASTM D1505 and ASTM D4703.

Vicat Softening Temperature was determined in accordance with ASTM D1525 (Loading 1, Rate A, ° C.). The peak melting point was determined using Differential Scanning calorimetry (DSC) as described in ASTM D3418 (2nd heat, ° C.) at a heating rate of 10° C./min.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 μL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8×300 mm) and were calibrated with a broad linear polyethylene standard (Chevron Phillips Chemical Marlex BHB 5003) for which the molecular weight had been determined. Mn is number-average molecular weight, Mw is weight-average molecular weight, and Mz is z-average molecular weight.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero-shear viscosity—$\eta_0$, characteristic viscous relaxation time—$\tau_\eta$, and the breadth parameter—a (the CY-a parameter). The simplified Carreau-Yasuda (CY) empirical model is as follows.

$$|\eta^*(\omega)| = \frac{\eta_0}{[1+(\tau_\eta\omega)^a]^{(1-n)/a}},$$

wherein: $|\eta^*(\omega)|$=magnitude of complex shear viscosity;
$\eta_0$=zero-shear viscosity;
$\tau_\eta$=viscous relaxation time;
a="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

The LCB levels in samples were calculated using the method of Janzen and Colby (*J. Mol. Struct.*, 485/486, 569 (1999)), from values of zero-shear viscosity, $\eta_0$ (estimated from Carreau-Yasuda model fitted to dynamic shear viscosity data), and measured values of Mw obtained using a Dawn EOS multiangle light scattering detector (Wyatt). See Y. Yu, D. C. Rohlfing, G. R Hawley, and P. J. DesLauriers, *Polymer Preprint*, 44, 50, (2003). The zero-shear melt viscosity was obtained by fitting the Carreau-Yasuda equation to the experimental viscosity derived at 190° C. as a function of shear rate.

Comonomer distribution and short chain branching content can be determined as described by P. J. DesLauriers, D. C. Rohlfing, and E. T. Hsieh in *Polymer*, 43, 159 (2002), and in U.S. Pat. No. 8,114,946, the disclosures of which are incorporated herein by reference in their entirety.

The blown film samples were produced on a laboratory-scale blown film line using typical linear low density polyethylene conditions (LLDPE) as follows: 100 mm (4 inch) die diameter, 2.8 mm (0.110 inch) die gap, 37.5 mm (1.5 inch) diameter single-screw extruder fitted with a barrier screw with a Maddock mixing section at the end (L/D=24, 2.2:1 compression ratio), 70-115 RPM screw speed (about 20-27 kg/hr (45-60 lb/hr) output rate), 2.5:1 blow up ratio (BUR), "in-pocket" bubble with a "freeze line height" (FLH) between 20-28 cm (8-11 inch), 190° C. (375° F.) barrel and die set temperatures and 25 micron (1 mil) and 250 micron (10 mil) thick film. Cooling was accomplished with a Dual Lip air ring using ambient (laboratory) air at about 25° C. (75-80° F.). These particular processing conditions were chosen because the film properties so obtained are typically representative of those obtained from larger, commercial scale film blowing conditions.

Stress versus strain curves and other film properties (e.g., see Table III) were performed in accordance with ASTM D882.

DETAILED DESCRIPTION OF THE INVENTION

The present invention is directed generally to ethylene-based polymers having a unique combination of polymer properties. Articles, such as blown and cast films, can be produced from these ethylene-based polymers and are suitable in a variety of end-use applications.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; or alternatively, the olefin comonomer can comprise a $C_4$-$C_{10}$ α-olefin.

According to another aspect of this invention, the olefin monomer can comprise ethylene, and the olefin comonomer can include, but is not limited to, propylene, 1-butene, 1-pentene, 1-hexene, 1-heptene, 1-octene, and the like, or combinations thereof. In yet another aspect, the comonomer can comprise 1-butene, 1-hexene, 1-octene, or any combination thereof. In still another aspect, the comonomer can comprise 1-butene; alternatively, 1-hexene; or alternatively, 1-octene. Typically, the amount of the comonomer, based on the total weight of monomer (ethylene) and comonomer, can be in a range from about 0.01 to about 40 wt. %, from about 0.1 to about 35 wt. %, from about 0.5 to about 30 wt. %, from about 1 to about 20 wt. %, from about 2 to about 18 wt. %, or from about 3 to about 15 wt. %.

In some aspects, the ethylene polymer of this invention can be an ethylene/α-olefin copolymer. For example, the ethylene polymer can be an ethylene/1-butene copolymer, an ethylene/1-hexene copolymer, or an ethylene/1-octene copolymer. In particular aspects contemplated herein, the ethylene polymer can be an ethylene/1-hexene copolymer.

An illustrative and non-limiting example of an ethylene polymer of the present invention can have a ratio of Mw/Mn of less than or equal to about 5, a ratio of Mz/Mw of less than or equal to about 2.3, and a zero-shear viscosity at 190° C. of greater than or equal to about $8 \times 10^4$ Pa-sec. Another illustrative and non-limiting example of an ethylene polymer of the present invention can have a ratio of Mw/Mn in a range from about 2 to about 5, a ratio of Mz/Mw in a range from about 1.5 to about 2.3, and a zero-shear viscosity at 190° C. in a range from about $8 \times 10^4$ to about $2 \times 10^6$ Pa-sec. Yet another illustrative and non-limiting example of an ethylene polymer of the present invention can have a ratio of Mw/Mn in a range from about 2.1 to about 3.5, a ratio of Mz/Mw in a range from about 1.5 to about 2.2, and a zero-shear viscosity at 190° C. in a range from about $1 \times 10^5$ to about $1 \times 10^6$ Pa-sec. These illustrative and non-limiting examples of ethylene polymers consistent with the present invention also can have any of the polymer properties listed below and in any combination.

Ethylene polymers in accordance with some aspects of this invention generally can have a melt index (MI) from 0 to about 10 g/10 min. MI's in the range from 0 to about 5 g/10 min, from 0 to about 2 g/10 min, or from 0 to about 1 g/10 min, are contemplated in other aspects of this invention. For example, a polymer of the present invention can have a MI in a range from about 0.05 to about 2, from about 0.05 to about 1, from about 0.05 to about 0.8, from about 0.1 to about 1, from about 0.1 to about 0.8, from about 0.15 to about 1, or from about 0.15 to about 0.75 g/10 min.

Ethylene polymers in accordance with this invention can have a ratio of HLMI/MI of greater than about 5; alternatively, greater than about 10; alternatively, greater than about 15; or alternatively, greater than about 25. Suitable ranges for HLMI/MI can include, but are not limited to, from about 10 to about 60, from about 15 to about 50, from about 20 to about 50, from about 20 to about 45, from about 20 to about 40, or from about 25 to about 35, and the like.

The densities of ethylene-based copolymers disclosed herein often are less than about 0.930 g/cm³. In one aspect of this invention, the density of an ethylene copolymer can be less than about 0.928, less than about 0.925, or less than about 0.92 g/cm³. Yet, in another aspect, the density can be in a range from about 0.895 to about 0.928 g/cm³, such as, for example, from about 0.90 to about 0.925 g/cm³, from about 0.905 to about 0.925 g/cm³, or from about 0.91 to about 0.92 g/cm³.

Ethylene polymers consistent with various aspects of the present invention generally can have a narrow molecular weight distribution, and often with weight-average molecular weights (Mw's) in a range from about 75,000 to about 250,000 g/mol, from about 85,000 to about 200,000 g/mol, from about 90,000 to about 150,000 g/mol, from about 100,000 to about 150,000 g/mol, from about 85,000 to about 140,000 g/mol, or from about 100,000 to about 175,000 g/mol, and the like. Likewise, suitable non-limiting ranges of the number-average molecular weight (Mn) can include from about 7,000 to about 70,000 g/mol, from about 10,000 to about 70,000 g/mol, from about 25,000 to about 70,000 g/mol, from about 30,000 to about 70,000 g/mol, or from about 35,000 to about 65,000 g/mol, and the like. Further, suitable ranges for the z-average molecular weight (Mz) can include, for instance, from about 175,000 to about 350,000 g/mol, from about 175,000 to about 300,000 g/mol, from about 200,000 to about 350,000 g/mol, from about 200,000 to about 300,000 g/mol, from about 210,000 to about 290,000 g/mol, or from about 225,000 to about 275,000 g/mol, and the like.

The ratio of Mw/Mn, or the polydispersity index, for the polymers of this invention often can be less than or equal to about 5, less than or equal to about 4.5, less than or equal to about 3.5, or less than or equal to about 3. In some aspects disclosed herein, the ratio of Mw/Mn can be in a range from about 2 to about 5, from about 2 to about 4, or from about 2 to about 3.5. In other aspects, the ratio of Mw/Mn can be in a range from about 2 to about 3, from about 2.1 to about 3.5, from about 2.1 to about 3, from about 2.1 to about 2.8, or from about 2.1 to about 2.7.

The ratio of Mz/Mw for the polymers of this invention often can less than or equal to about 2.5, less than or equal to about 2.4, less than or equal to about 2.3, or less than or equal to about 2.2. For example, the Mz/Mw ratio can be in a range from about 1.5 to about 2.4, from about 1.5 to about 2.3, from about 1.5 to about 2.2, from about 1.5 to about 2.1, or from about 1.5 to about 2.

Generally, ethylene polymers consistent with aspects of the present invention have levels of long chain branches (LCB) per 1000 total carbon atoms in a range from about 0.008 to about 0.04, from about 0.009 to about 0.035, or from about 0.01 to about 0.03 LCB per 1000 total carbon atoms. In some aspects, the number of LCB per 1000 total carbon atoms can be in a range from about 0.008 to about 0.035, from about 0.01 to about 0.025, or from 0.012 to about 0.022 LCB per 1000 total carbon atoms.

Ethylene copolymers described herein can, in some aspects, have a reverse comonomer distribution, i.e., a short chain branch content that generally increases as molecular weight increases, for example, the higher molecular weight components of the polymer generally have higher comonomer incorporation than the lower molecular weight components. Typically, there is increasing comonomer incorporation with increasing molecular weight. For instance, the number of short chain branches (SCB's) per 1000 total carbon atoms can be greater at Mw than at Mn. In one aspect, the ratio of the number of short chain branches (SCB) per 1000 total carbon atoms of the polymer at Mw to the number of SCB per 1000 total carbon atoms of the polymer at Mn can be in a range from about 1.1:1 to about 5:1, or alternatively, in a range from about 1.5:1 to about 4:1.

In some aspects, ethylene polymers described herein can have a zero-shear viscosity at 190° C. of greater than or equal to about $8 \times 10^4$ Pa-sec, or greater than or equal to about $1 \times 10^5$ Pa-Sec. While not wishing to be bound by theory, Applicants believe that a higher zero-shear viscosity may correlate with a higher polymer melt strength (e.g., better bubble stability in blown film). Suitable ranges for the zero-shear viscosity can include, but are not limited to, from about $8 \times 10^4$ to about $2 \times 10^6$, from about $1 \times 10^5$ to about $2 \times 10^6$, from about $1 \times 10^5$ to about $1 \times 10^6$, from about $1 \times 10^5$ to about $8 \times 10^5$, or from about $1 \times 10^5$ to about $5 \times 10^5$ Pa-sec.

In some aspects, the ethylene polymer can have a CY-a parameter at 190° C. in a range from about 0.08 to about 0.28, from about 0.09 to about 0.25, from about 0.1 to about 0.25, from about 0.1 to about 0.22, from about 0.08 to about 0.18, from about 0.1 to about 0.2, or from about 0.1 to about 0.18.

The peak melting point of the ethylene polymer (2nd heat, DSC) often can be less than or equal to about 125° C., and more often, less than or equal to about 120° C. For instance, the peak melting point of the ethylene polymer can be in a range from about 100 to about 120° C., from about 105 to about 120° C., or from about 110 to about 120° C.

The vicat softening temperature of the ethylene polymer often can be at least about 90° C., and more often, at least about 95° C. For instance, the vicat softening temperature of the ethylene polymer can be in a range from about 100 to about 120° C., from about 100 to about 110° C., from about 95 to about 110° C., or from about 95 to about 105° C.

Generally, the difference (or delta) between the peak melting point and the vicat softening temperature of the ethylene polymer can be less than or equal to about 20° C., such as, for instance, less than or equal to about 18° C., less than or equal to about 16° C., or less than or equal to about 14° C.

Consistent with aspects of the present invention, the ethylene polymer can be produced from a base resin (discussed hereinbelow) via a process comprising contacting the base resin with a peroxide compound at a temperature sufficient to generate peroxide groups at about 10 to about 50 ppm of peroxide groups based on the weight of the base resin. In some aspects, the amount of peroxide groups in the peroxide compound, based on the weight of the base resin, can be in a range from about 10 to about 45 ppm, from about 15 to about 50 ppm, from about 15 to about 45 ppm, from about 20 to about 50 ppm, from about 20 to about 45 ppm, from about 25 to about 50 ppm, or from about 25 to about 45 ppm.

The peroxide compound can be any compound containing one or more peroxide (O—O) groups, suitable examples of which can include, but are not limited to, 2,5-dimethyl-2,5-di(t-butylperoxy)hexane, dicumyl peroxide, t-butyl cumyl peroxide, n-butyl-4,4'-di(t-butylperoxy)valerate, and the like.

In an aspect, the step of contacting the base resin with the peroxide compound can comprise melt processing a blend (or mixture) of the base resin and the peroxide compound at any suitable melt processing temperature, such as, for example, a temperature in a range from about 120 to about 300° C., a temperature in a range from about 150 to about 250° C., a temperature in a range from about 175 to about 225° C., and so forth. The appropriate temperature may depend upon the composition of the peroxide compound and the temperature at which it liberates peroxide groups. Prior to contacting the peroxide compound, the base resin can be in any suitable form including, for example, fluff, powder, granulate, pellet, solution, slurry, emulsion, and the like. Similarly, the peroxide compound can be in solid form, in solution, or in a slurry. One particular method uses a resin-based masterbatch of the peroxide compound, and contacts the base resin after it has been melted.

The present invention is not limited to any particular method of contacting and melt processing the base resin and the peroxide compound. Various methods of mixing and/or compounding can be employed, as would be recognized by those of skill in the art. In one aspect, the melt processing of the base resin and the peroxide compound can be performed in a twin screw extrusion system. In another aspect, the melt processing of the base resin and the peroxide compound can be performed in a single screw extrusion system.

Films and Articles

Articles of manufacture can be formed from, and/or can comprise, the ethylene polymers of this invention and, accordingly, are encompassed herein. For example, articles which can comprise ethylene polymers of this invention can include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

In some aspects, the article produced from and/or comprising an ethylene polymer of this invention is a film product. For instance, the film can be a blown film or a cast film that is produced from and/or comprises an ethylene polymer disclosed herein. Such films also can contain one or more additives, non-limiting examples of which can include an antioxidant, an acid scavenger, an antiblock additive, a slip additive, a colorant, a filler, a processing aid, a UV inhibitor, and the like, as well as combinations thereof.

Applicants also contemplate a method for making a film (e.g., a blown film, a cast film, etc.) comprising any ethylene polymer disclosed herein. For instance, the method can comprise melt processing the ethylene polymer through a die to form the film. Suitably, the die can be configured based on the film to be produced, for example, an annular blown film die to produce a blown film, a slot or cast film die to produce a cast film, and so forth. Moreover, any suitable means of melt processing can be employed, although extrusion typically can be utilized. As above, additives can be combined with the ethylene polymer in the melt processing step (extrusion step), such as antioxidants, acid scavengers, antiblock additives, slip additives, colorants, fillers, processing aids, UV inhibitors, and the like, as well as combinations thereof.

Films disclosed herein, whether cast or blown, can be any thickness that is suitable for the particular end-use application, and often, the film thickness can be in a range from about 0.5 to about 250 mils, or from about 1 to about 200 mils. Thicker films generally are employed in geomembrane and related applications, and these films can have thicknesses in a range from about 10 to about 200 mils, from about 20 to about 200 mils, from about 25 to about 150 mils, from about 30 to about 120 mils, or from about 40 to about 100 mils.

In an aspect and unexpectedly, the films disclosed herein, whether cast or blown, can have a generally non-distinct yield point in the transverse direction (TD). While not wishing to be bound by theory, Applicants believe that thick films with a non-distinct yield point may be less susceptible to thinning or failures in creased and/or folded areas. One measure of the non-distinct yield point is the ratio of the maximum stress at a strain of less than 40% to the maximum stress at a strain in the 40% to 60% range, in a stress versus strain curve in the TD for a 10-mil film (e.g., a blown film, a cast film). In some aspects, the ratio can be less than or equal to 1, less than or equal to about 0.99, or less than or equal to about 0.98, while in other aspects, the ratio can be in a range from about 0.85 to 1, from about 0.9 to about 0.99, or from about 0.9 to about 0.98. In another aspect, the generally non-distinct yield point can be measured by the ratio of the maximum stress at a strain of less than 40% to the maximum stress at a strain in the 40% to 60% range, in a stress versus strain curve in the TD for a 1-mil film (e.g., a blown film, a cast film). In some aspects, the ratio can be less than or equal to 1.1, less than or equal to about 1, less than or equal to about 0.99, or less than or equal to about 0.98, while in other aspects, the ratio can be in a range from about 0.85 to 1.1, from about 0.9 to about 1, or from about 0.9 to about 0.99.

Also unexpectedly, in a stress versus strain curve in the transverse direction (TD) for a 10-mil film, the slope is not negative in the 25% to 50% strain range in some aspects of this invention. In further aspects, and unexpectedly, in a stress versus strain curve in the transverse direction (TD) for a 10-mil film, the stress at 50% strain can be greater than the stress at the yield point. Likewise, in a stress versus strain curve in the transverse direction (TD) for a 1-mil film, the slope is not negative in the 25% to 30% strain range in some aspects of this invention. Moreover, and unexpectedly, in a stress versus strain curve in the transverse direction (TD) for a 1-mil film, the ratio of the stress at 30% strain to the stress at the yield point can be greater than or equal to 0.9, for example, greater than or equal to about 0.95, greater than or equal to about 1, in a range from 0.9 to about 1.2, in a range from 0.9 to about 1.1, in a range from about 0.95 to about 1.2, in a range from about 0.95 to about 1.1, and the like. For these film (stress-strain) evaluations of 1-mil and 10-mil films, the equipment and fabrication conditions used are as described herein above.

Base Resins

Generally, the base resin used to produce the ethylene polymer can be any homopolymer of ethylene or copolymer, terpolymer, etc., of ethylene and at least one olefin comonomer disclosed hereinabove for the ethylene polymer. Thus, the base resin can be an ethylene/α-olefin copolymer, such as an ethylene/1-butene copolymer, an ethylene/1-hexene copolymer, or an ethylene/1-octene copolymer. Typically, for example, if the base resin is an ethylene/1-hexene copolymer, then the ethylene polymer produced from the base resin also is an ethylene/1-hexene copolymer, although mixtures and combinations of various types of homopolymers and copolymers can be used.

The base resin used to produce ethylene polymers in accordance with some aspects of this invention generally can have a melt index (MI) from 0 to about 5 g/10 min. MI's in the range from 0 to about 2 g/10 min, from about 0.25 to about 5 g/10 min, or from about 0.25 to about 2 g/10 min, are contemplated in other aspects of this invention. For example, a base resin can have a MI in a range from about 0.25 to about 2.5, from about 0.5 to about 2.5, from about 0.5 to about 2, from about 0.5 to about 1.75, from about 0.5 to about 1.5, from about 0.75 to about 2, or from about 0.75 to about 1.75 g/10 min.

The base resin used to produce ethylene polymers in accordance with this invention can have a ratio of HLMI/MI of greater than about 5; alternatively, greater than about 8; alternatively, greater than about 10; or alternatively, greater than about 15. Suitable ranges for HLMI/MI can include, but are not limited to, from about 8 to about 35, from about 10 to about 35, from about 10 to about 30, from about 10 to about 25, from about 10 to about 20, or from about 15 to about 30, and the like.

The densities of copolymer base resin used to produce ethylene copolymers disclosed herein often are less than about 0.930 g/cm$^3$. In one aspect of this invention, the density of a base resin can be less than about 0.928, less than about 0.925, or less than about 0.92 g/cm$^3$. Yet, in another aspect, the density can be in a range from about 0.895 to about 0.928 g/cm$^3$, such as, for example, from about 0.90 to about 0.925 g/cm$^3$, from about 0.905 to about 0.925 g/cm$^3$, or from about 0.91 to about 0.92 g/cm$^3$.

Base resins consistent with various aspects of the present invention generally can have a narrow molecular weight distribution, and often with weight-average molecular weights (Mw's) in a range from about 75,000 to about 250,000 g/mol, from about 85,000 to about 200,000 g/mol, from about 90,000 to about 150,000 g/mol, from about 100,000 to about 150,000 g/mol, from about 85,000 to about 140,000 g/mol, or from about 100,000 to about 175,000 g/mol, and the like. Likewise, suitable non-limiting ranges of the number-average molecular weight (Mn) can include from about 7,000 to about 70,000 g/mol, from about 10,000 to about 70,000 g/mol, from about 25,000 to about 70,000 g/mol, from about 30,000 to about 70,000 g/mol, or from about 35,000 to about 65,000 g/mol, and the like. Further, suitable ranges for the z-average molecular weight (Mz) can include, for instance, from about 165,000 to about 350,000 g/mol, from about 165,000 to about 300,000 g/mol, from about 175,000 to about 300,000 g/mol, from about 175,000 to about 275,000 g/mol, from about 200,000 to about 300,000 g/mol, or from about 200,000 to about 290,000 g/mol, and the like.

The ratio of Mw/Mn, or the polydispersity index, for the base resins of this invention often can less than or equal to about 5, less than or equal to about 4.5, less than or equal to about 3.5, or less than or equal to about 3. In some aspects disclosed herein, the ratio of Mw/Mn can be in a range from about 2 to about 5, from about 2 to about 4, or from about 2 to about 3.5. In other aspects, the ratio of Mw/Mn can be in a range from about 2 to about 3, from about 2.1 to about 3.5, from about 2.1 to about 3, from about 2.1 to about 2.8, or from about 2.1 to about 2.7.

The ratio of Mz/Mw for the base resins of this invention often can less than or equal to about 2.5, less than or equal to about 2.4, less than or equal to about 2.3, or less than or equal to about 2.2. For example, the Mz/Mw ratio can be in a range from about 1.5 to about 2.4, from about 1.5 to about 2.3, from about 1.5 to about 2.2, from about 1.5 to about 2.1, or from about 1.5 to about 2.

Generally, base resins consistent with aspects of the present invention can have low levels of long chain branches (LCB) per 1000 total carbon atoms, such as less than about 0.008 LCB per 1000 total carbon atoms, but greater than zero. In some aspects, the number of LCB per 1000 total carbon atoms can less than about 0.006 LCB, less than about 0.005 LCB, or less than about 0.003 LCB, per 1000 total carbon atoms.

Base resins described herein can, in some aspects, have a reverse comonomer distribution, i.e., a short chain branch content that generally increases as molecular weight increases, for example, the higher molecular weight components of the polymer generally have higher comonomer incorporation than the lower molecular weight components. Typically, there is increasing comonomer incorporation with increasing molecular weight. For instance, the number of short chain branches (SCB's) per 1000 total carbon atoms can be greater at Mw than at Mn. In one aspect, the ratio of the number of short chain branches (SCB) per 1000 total carbon atoms of the base resin at Mw to the number of SCB per 1000 total carbon atoms of the polymer at Mn can be in a range from about 1.1:1 to about 5:1, or alternatively, in a range from about 1.5:1 to about 4:1.

In some aspects, base resins described herein can have a zero-shear viscosity at 190° C. in a range from about $2 \times 10^3$ Pa-sec to about $7 \times 10^4$ Pa-Sec. Suitable ranges for the zero-shear viscosity of the base resin can include, but are not limited to, from about $2 \times 10^3$ to about $5 \times 10^4$, from about $3 \times 10^3$ to about $5 \times 10^4$, from about $2 \times 10^3$ to about $2 \times 10^4$, from about $3 \times 10^3$ to about $2 \times 10^4$, or from about $2 \times 10^3$ to about $1 \times 10^4$ Pa-sec.

In some aspects, the base resin can have a CY-a parameter at 190° C. in a range from about 0.4 to about 0.8, from about 0.5 to about 0.8, from about 0.4 to about 0.7, from about 0.5 to about 0.7, from about 0.45 to about 0.75, from about 0.55 to about 0.75, or from about 0.55 to about 0.7.

The peak melting point of the base resin (2nd heat, DSC) often can be less than or equal to about 125° C., and more often, less than or equal to about 120° C. For instance, the peak melting point of the base resin can be in a range from about 100 to about 120° C., from about 105 to about 120° C., or from about 110 to about 120° C.

The vicat softening temperature of the base resin often can be at least about 90° C., and more often, at least about 95° C. For instance, the vicat softening temperature of the base resin can be in a range from about 100 to about 120° C., from about 100 to about 110° C., or from about 95 to about 105° C.

Generally, the difference (or delta) between the peak melting point and the vicat softening temperature of the base resin can be less than or equal to about 20° C., such as, for instance, less than or equal to about 18° C., less than or equal to about 16° C., or less than or equal to about 14° C.

Consistent with aspects of the present invention, the base resin can be produced using a metallocene-based catalyst system. Thus, the base resin can be produced using a metallocene-based catalyst system containing any suitable metallocene compound and any suitable activator (one or more than one metallocene compound and one or more than one activator can be employed). The metallocene compound can comprise, for example, a transition metal from Groups III, IV, V, or VI of the Periodic Table of the Elements, or a combination of two or more transition metals. The metallocene compound can comprise chromium, titanium, zirconium, hafnium, vanadium, or a combination thereof, or can comprise titanium, zirconium, hafnium, or a combination thereof, in certain aspects. Accordingly, the metallocene compound can comprise titanium, or zirconium, or hafnium, either singly or in combination.

While not being limited thereto, the metallocene compound can comprise an unbridged metallocene compound in an aspect of this invention. For instance, the metallocene compound can comprise an unbridged zirconium or hafnium based metallocene compound and/or an unbridged zirconium and/or hafnium based dinuclear metallocene compound. In one aspect, the metallocene compound can comprise an unbridged zirconium or hafnium based metallocene compound containing two cyclopentadienyl groups, two indenyl groups, or a cyclopentadienyl and an indenyl group. In another aspect, the metallocene compound can comprise an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with aspects of the present invention are described in U.S. Pat. Nos. 7,226,886 and 7,619,047, the disclosures of which are incorporated herein by reference in their entirety.

In other aspects, the metallocene compound can comprise an unbridged zirconium and/or hafnium based dinuclear metallocene compound. For example, the metallocene compound can comprise an unbridged zirconium based homodinuclear metallocene compound, or an unbridged hafnium based homodinuclear metallocene compound, or an unbridged zirconium and/or hafnium based heterodinuclear metallocene compound (i.e., a dinuclear compound with two hafniums, or two zirconiums, or one zirconium and one hafnium). These and other suitable dinuclear compounds (bridged and unbridged) are described in U.S. Pat. Nos. 7,863,210, 7,919,639, 8,012,900, and 8,080,681, the disclosures of which are incorporated herein by reference in their entirety.

The metallocene compound can comprise a bridged metallocene compound, e.g., with titanium, zirconium, or hafnium. Accordingly, the metallocene compound can comprise a bridged zirconium based metallocene compound with a fluorenyl group, and with no aryl groups on the bridging group, or a bridged zirconium based metallocene compound with a cyclopentadienyl group and a fluorenyl group, and with no aryl groups on the bridging group. Such bridged metallocenes, in some aspects, can contain an alkenyl substituent (e.g., a terminal alkenyl) on the bridging group and/or on a cyclopentadienyl-type group (e.g., a cyclopentadienyl group, a fluorenyl group, etc.).

In another aspect, the metallocene compound can comprise a bridged zirconium or hafnium based metallocene compound with a fluorenyl group, and an aryl group on the bridging group. Thus, the metallocene compound can comprise a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group and/or on a cyclopentadienyl-type group.

Illustrative and non-limiting examples of bridged metallocene compounds (e.g., with zirconium or hafnium) that can be employed in catalyst systems consistent with aspects of the present invention are described in U.S. Pat. Nos. 7,041,617, 7,226,886, 7,517,939, 7,619,047, and 8,329,834, the disclosures of which are incorporated herein by reference in their entirety.

In one aspect, the catalyst composition contains only one metallocene compound, while in another aspect, the catalyst composition contains two or more metallocene compounds. If two or more metallocene compounds are used, the relative amounts of each respective metallocene compound are not restricted to any particular range. For instance, if the catalyst composition contains two metallocene compounds, the weight ratio of the first metallocene catalyst component to the second metallocene catalyst component can be in a range of from about 1:100 to about 100:1, from about 1:50 to about 50:1, from about 1:25 to about 25:1, from about 1:20 to about 20:1, from about 1:15 to about 15:1, from about 1:10 to about 10:1, or from about 1:5 to about 5:1. Accordingly, suitable ranges for the weight ratio of the first metallocene catalyst component to the second metallocene catalyst component can include, but are not limited to, from about 1:4 to about 4:1, from about 1:3 to about 3:1, from about 1:2 to about 2:1, from about 1:1.5 to about 1.5:1, from about 1:1.25 to about 1.25:1, or from about 1:1.1 to about 1.1:1, and the like.

Typically, the metallocene-based catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599 and 7,601,665, the disclosures of which are incorporated herein by reference in their entirety.

The solid oxide used to produce the activator-support can comprise oxygen and one or more elements from Groups 2, 3, 4, 5, 6, 7, 8, 9, 10, 11, 12, 13, 14, or 15 of the periodic table, or comprising oxygen and one or more elements from the lanthanide or actinide elements (see e.g., Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For instance, the solid oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Accordingly, suitable examples of solid oxide materials that can be used to form the activator-supports can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. This includes co-gels or co-precipitates of different solid oxide materials. The solid oxide can encompass oxide materials such as alumina, "mixed oxides" thereof such as silica-alumina, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163, the disclosure of which is incorporated herein by reference in its entirety.

Accordingly, in one aspect, the solid oxide can comprise silica, alumina, silica-alumina, silica-coated alumina, aluminum phosphate, aluminophosphate, heteropolytungstate, titania, zirconia, magnesia, boria, zinc oxide, any mixed oxide thereof, or any combination thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise silica; alternatively, alumina; alternatively, silica-alumina; or alternatively, silica-coated alumina.

The silica-alumina which can be used typically can have an alumina content from about 5 to about 95% by weight. In one aspect, the alumina content of the silica-alumina can be from about 5 to about 50%, or from about 8% to about 30%, alumina by weight. In another aspect, high alumina content silica-alumina compounds can be employed, in which the alumina content of these silica-alumina compounds typically can range from about 60% to about 90%, or from about 65% to about 80%, alumina by weight. According to yet another aspect, the solid oxide component can comprise alumina without silica, and according to another aspect, the solid oxide component can comprise silica without alumina. Moreover, as provided hereinabove, the solid oxide can comprise a silica-coated alumina. The solid oxide can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof.

In an aspect, the catalyst system can comprise an activator-support, and the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another aspect, the catalyst system can comprise an activator-support, and the activator-support can comprise fluorided alumina, sulfated alumina, fluorided silica-alumina, sulfated silica-alumina, fluorided silica-zirconia, fluorided silica-coated alumina, sulfated silica-coated alumina, and the like, as well as any mixture or combination thereof.

Commonly used polymerization co-catalysts can include, but are not limited to, metal alkyl, or organometal, co-catalysts, with the metal encompassing boron, aluminum, and the like. Optionally, the catalyst systems provided herein can comprise a co-catalyst, or a combination of co-catalysts. For instance, alkyl boron and/or alkyl aluminum compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof.

The base resins can be produced using any suitable olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.), and as discussed hereinabove.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally can be within a range from about 70° C. to about 90° C., or from about 75° C. to about 85° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Examples 1-9

The LLDPE resin of Example 1 was a commercially-available ethylene/1-hexene copolymer (Chevron Phillips Chemical Company LP) produced using a chromium-based catalyst system. The LLDPE resin of Example 2 was a commercially-available ethylene/1-hexene copolymer (Chevron Phillips Chemical Company LP) produced using a Ziegler-based catalyst system. The LLDPE resin of Example 3 was a commercially-available ethylene/1-hexene copolymer (Chevron Phillips Chemical Company LP) produced using a metallocene-based catalyst system. The LLDPE resin of Example 5 was a commercially-available ethylene/1-hexene copolymer (Chevron Phillips Chemical Company LP) produced using a metallocene-based catalyst system. The properties of the polymers of Examples 1-3 and 5 are listed in Table I.

The LLDPE resin of Example 4 was prepared by first dry blending a base resin (Example 3) with 300 ppm by weight (ppmw) of a masterbatch containing a polyethylene carrier resin and 45 wt. % of 2,5-dimethyl-2,5-di(t-butylperoxy) hexane. Based on the weight percent of the two O-O groups in the compound and the 45 wt. % loading in concentrate, the 300 ppmw loading of the masterbatch in the base resin equates to about 30 ppmw of peroxide groups, based on the weight of the base resin. The blend of the base resin and peroxide masterbatch was compounded using a twin screw extrusion system, and then pelletized to form the ethylene/1-hexene copolymer of Example 4. Compounding was done on a laboratory ZSK-40 twin screw extruder equipped with a melt pump. The extruder was a super compounder with OD/ID ratio of 1.55 and screw L/D ratio of 28.9. Nitrogen purge was used at the extruder feed port. Standard conditions of rate (65 kg/hr), screw speed (230 rpm) and 20 mesh filter screen were used, and resulted in a melt temperature of about 478° F. and specific energy of 0.13 kW-hr/kg. A 10-hole strand die plate was used for pelletizing. The pellet count was adjusted to 35/gram. The LLDPE resin of Example 6 was prepared as described for Example 4, except that the base resin was Example 5 and the peroxide concentrate loading was 400 ppmw (about 40 ppmw of peroxide groups based on the weight of the base resin). The properties of the polymers of Examples 4 and 6 also are listed in Table I.

As shown in Table I, the polymers of Examples 4 and 6, as compared to Examples 3 and 5, respectively, exhibited an unexpected combination of properties: lower MI, lower HLMI, higher HLMI/MI, higher $\eta_0$, lower CY-a parameter, and higher LCB content, while the density, peak melting point, vicat softening temperature, and difference between the melting point and the softening temperature (A) were substantially unchanged. The Mn, Mw, Mz, Mw/Mn, and Mz/Mw of the polymers of Examples 4 and 6, as compared to Examples 3 and 5, respectively, increased only slightly, particularly as compared to the significant changes in the MI, HLMI, HLMI/MI, $\eta_0$, CY-a parameter, and LCB content. Thus, the improvement in polymer melt strength as demonstrated, for example, by the reduction in MI and HLMI and the increase in $\eta_0$ and LCB content, was achieved without significant changes in several other polymer properties.

Table I also demonstrates that the polymers of Examples 4 and 6, as compared to Examples 1-2, exhibited relatively similar values of $\eta_0$, CY-a parameter, and LCB content, and thus would be expected to have relatively similar melt strengths. However, and unexpectedly, these similar properties were achieved despite the much lower ratios of Mw/Mn, Mz/Mw, and HLMI/MI of Examples 4 and 6 as compared to Examples 1-2, as well as the lower peak melting point and the smaller difference between the melting point and the softening temperature (A) of Examples 4 and 6.

Table II summarizes certain properties of the polymers of Examples 1-9. The LLDPE resins of Example 7 and Example 8 were prepared as described for Example 6, except that the peroxide concentrate loading was 300 ppmw and 600 ppmw, respectively (about 30 ppmw and about 60 ppmw, respectively, of peroxide groups based on the weight of the base resin). The LLDPE resin of Example 9 was a commercially-available ethylene/1-octene copolymer (Dow Chemical Company) produced using a Ziegler-based catalyst system and having a nominal 0.905 density. The unique combination of rheological and thermal properties of the polymers of Examples 4 and 6 are demonstrated in Table II. FIG. 1 illustrates the dynamic rheology properties (viscosity versus shear rate) for the polymers of Examples 1-8 at 190° C.

Figure 2:
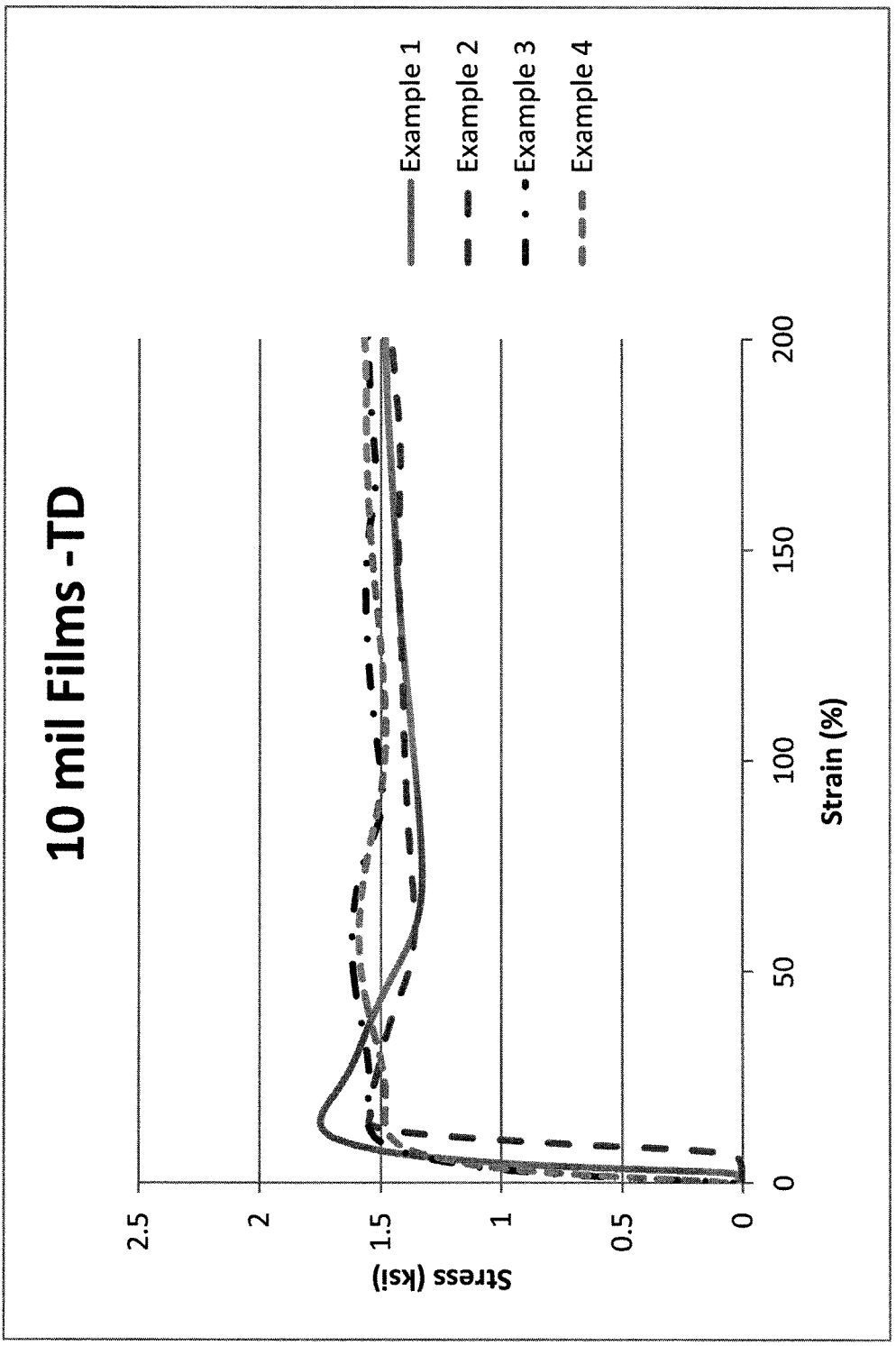
FIG. 2 presents a tensile plot (stress versus strain) for the 10-mil blown films of Examples 1-4 in the transverse direction (TD).
Figure 3:
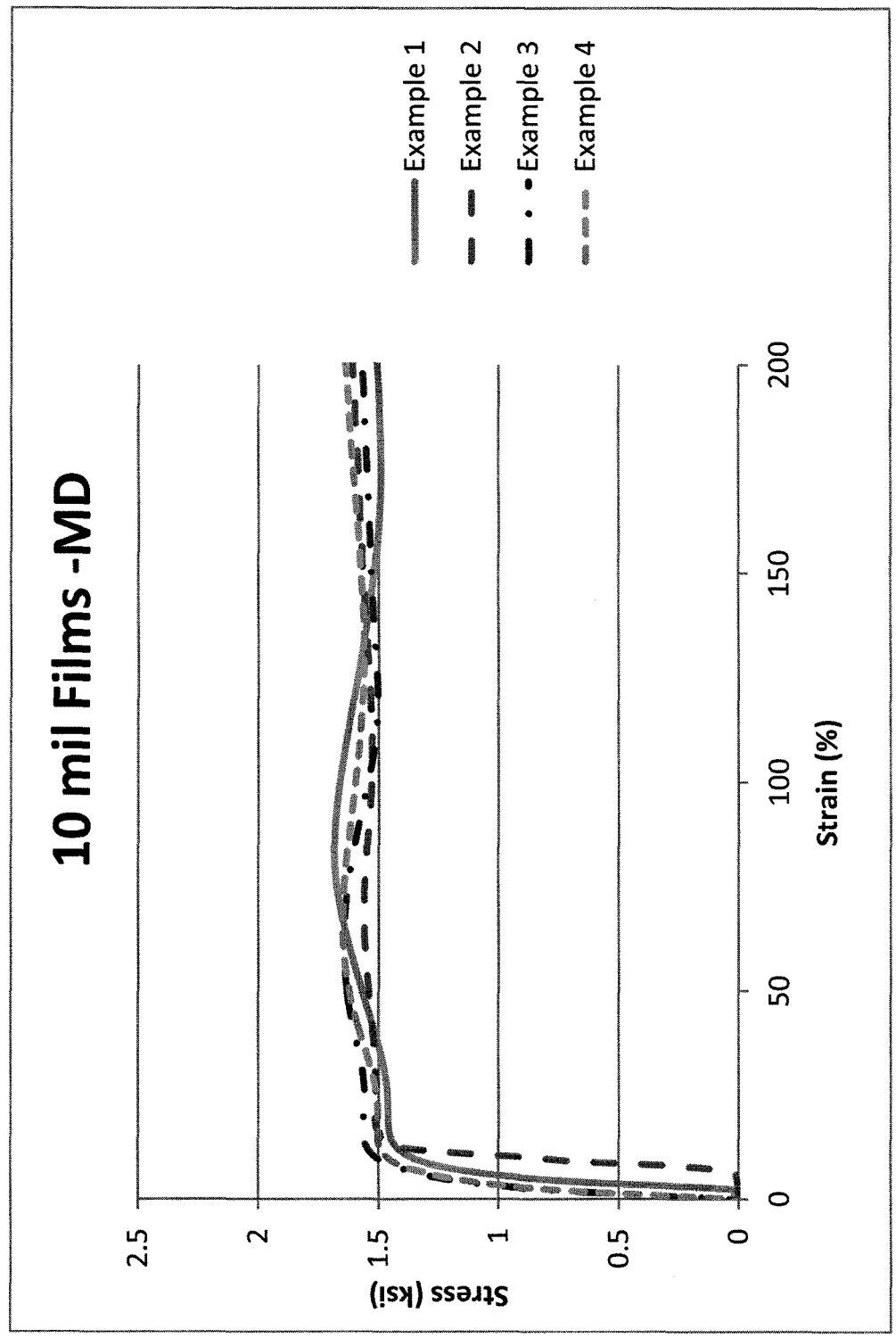
FIG. 3 presents a tensile plot (stress versus strain) for the 10-mil blown films of Examples 1-4 in the machine direction (MD).
Figure 4:
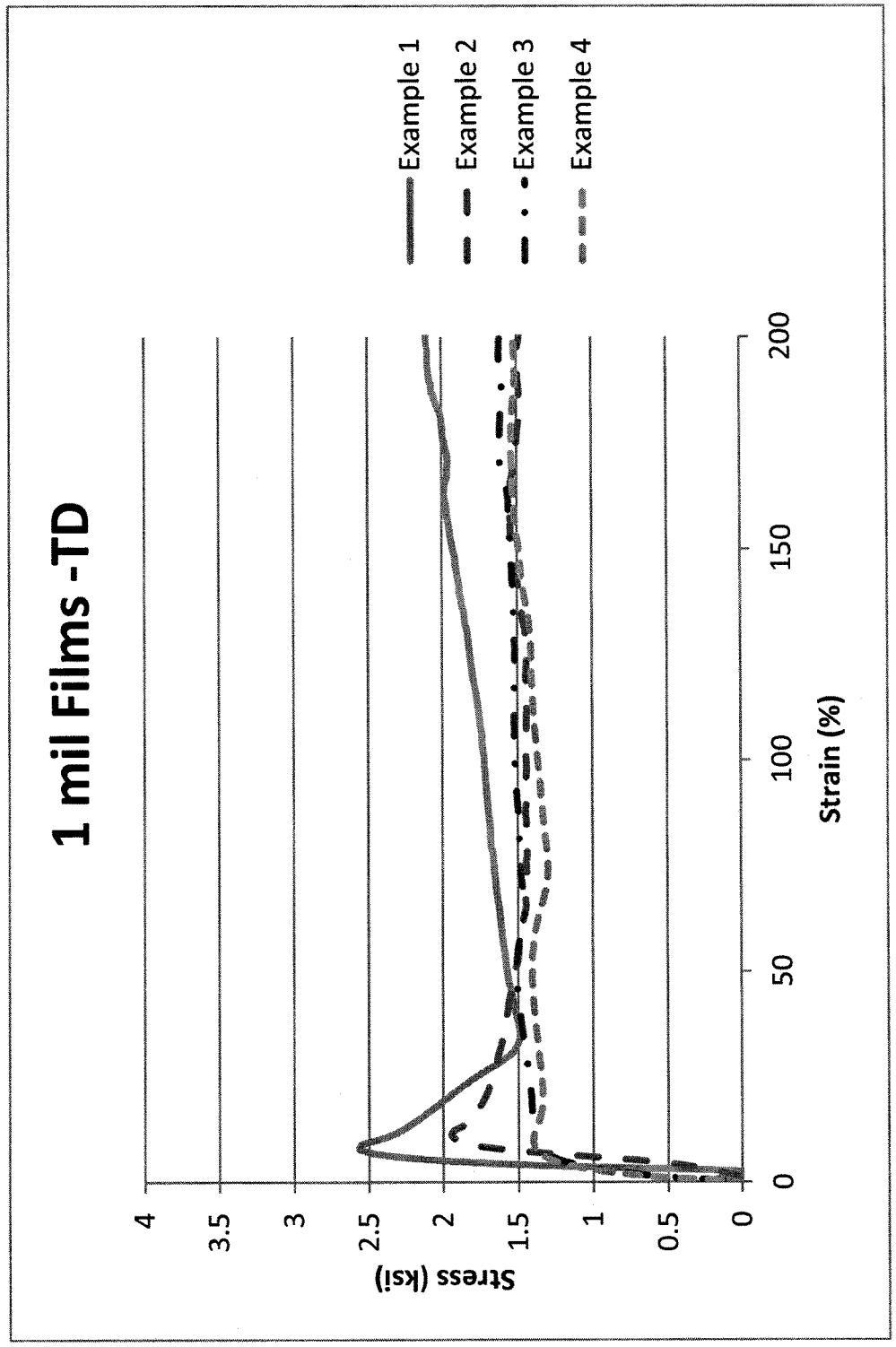
FIG. 4 presents a tensile plot (stress versus strain) for the 1-mil blown films of Examples 1-4 in the transverse direction (TD).

Blown film samples were produced from the polymers of Examples 1-4 at a 1-mil thickness and a 10-mil thickness, the latter designed to simulate the performance of thick gauge films up to a film thickness of 100 mils, and above. FIG. 2 is a tensile plot (stress versus strain) for the 10-mil blown films of Examples 1-4 in the transverse direction (TD), while FIG. 3 is a tensile plot (stress versus strain) for the 10-mil blown films of Examples 1-4 in the machine direction (MD). FIG. 4 is a tensile plot (stress versus strain) for the 1-mil blown films of Examples 1-4 in the transverse direction (TD). Table III summarizes certain properties of the films of Examples 1-4.

FIG. 2 in the TD, unlike FIG. 3 in the MD, illustrates a surprising difference in the tensile curves of Example 3-4 as compared to Examples 1-2: Examples 3-4 show a non-distinct yield point in the TD, whereas Examples 1-2 show a distinct yield point in the TD followed by sharp decrease in stress up to an elongation of over 50%. FIG. 4 illustrates the same difference in tensile curves in the TD for 1-mil films. The non-distinct yield point of the films of Examples 3-4 can be important for the suitability of thick films that are creased or folded, as films with the non-distinct yield point attribute generally do not exhibit failures in the creased/folded areas as compared to the films of Examples 1-2. Various measurements from the tensile curves which numerically demonstrate the differences between the film properties (stress-strain) of Examples 3-4, as compared to Examples 1-2, are summarized in Table III.

Table IV provides a comparison of the amount of gels in film samples produced from the polymers of Examples 2 and 5-7. Gels were measured on 25 micron (1 mil) thick films using an automated camera-based gel counting machine made by Optical Control System (OCS), Model FS-5. The system consists of a light source and a detector. The film was passed through the system, between the light source and the detector, with a 150 mm (6 inch) inspection width. A total of 10 square meters of film area was inspected and the gels with size greater than 200 microns were analyzed. The counts represent the total gels, on a number of gels/square foot basis, with size >200 micron as detected by the OCS system. Surprisingly, both of Examples 6-7 (produced using peroxide treating) had less gels than that of the commercial ethylene copolymer of Example 2.

TABLE I

Property Summary for the Polymers of Examples 1-6

|  | Example 1 | Example 2 | Example 3 | Example 4 | Example 5 | Example 6 |
|---|---|---|---|---|---|---|
| Density (g/cc) | 0.922 | 0.918 | 0.916 | 0.916 | 0.914 | 0.914 |
| MI (g/10 min) | 0.15 | 0.32 | 1.45 | 0.51 | 0.93 | 0.33 |
| HLMI (g/10 min) | 14.5 | 14.1 | 24.4 | 15.7 | 16.1 | 10.5 |
| HLMI/MI | 97 | 44 | 17 | 31 | 17 | 32 |
| Peak Melting Point (° C.) | 123 | 126 | 116 | 115 | 115 | 113 |
| Vicat Softening Temperature (° C.) | 108 | 102 | 103 | 103 | 103 | 102 |
| Δ Melting − Softening (° C.) | 15 | 24 | 13 | 12 | 12 | 11 |
| Mn (g/mol) | 10,800 | 21,100 | 43,700 | 46,200 | 58,700 | 59,500 |
| Mw (g/mol) | 166,000 | 145,000 | 108,000 | 119,000 | 132,000 | 142,000 |
| Mz (g/mol) | 785,000 | 404,000 | 191,000 | 231,000 | 229,000 | 255,000 |
| Mw/Mn | 15.3 | 6.9 | 2.5 | 2.6 | 2.2 | 2.4 |
| Mz/Mw | 4.7 | 2.8 | 1.8 | 1.9 | 1.7 | 1.8 |
| $\eta_o$ (Pa-sec) | 985,000 | 155,000 | 4,600 | 146,000 | 7,500 | 125,000 |
| CY-a parameter | 0.167 | 0.174 | 0.648 | 0.131 | 0.605 | 0.168 |
| LCB (per 1000 total C atoms) | 0.016 | 0.012 | 0.002 | 0.021 | 0.001 | 0.012 |

TABLE II

Properties of Examples 1-9.

| Example | $\eta_o$ (Pa-sec) | CY-a | Peak Melting Point (° C.) | Vicat Softening Temperature (° C.) | Δ Melting − Softening (° C.) | Density (g/cm$^3$) |
|---|---|---|---|---|---|---|
| 1 | 985,000 | 0.167 | 123 | 108 | 15 | 0.922 |
| 2 | 155,000 | 0.174 | 126 | 102 | 24 | 0.918 |
| 3 | 4,600 | 0.648 | 116 | 103 | 13 | 0.916 |
| 4 | 146,000 | 0.131 | 115 | 103 | 12 | 0.916 |
| 5 | 7,500 | 0.605 | 115 | 103 | 12 | 0.914 |
| 6 | 125,000 | 0.168 | 113 | 102 | 11 | 0.914 |
| 7 | 41,200 | 0.230 | — | — | — | — |
| 8 | 5,660,000 | 0.093 | — | — | — | — |
| 9 | — | — | 122 | 84 | 38 | 0.905 |

TABLE III

Film Property Summary for Examples 1-4

|  | Example 1 | Example 2 | Example 3 | Example 4 |
|---|---|---|---|---|
| Ratio of: Max Stress @ <40% Strain / Max Stress @ 40-60% Strain (10 mil film, TD) | 1.14 | 1.06 | 0.980 | 0.973 |
| Ratio of: Max Stress @ <40% Strain / Max Stress @ 40-60% Strain (1 mil film, TD) | 1.60 | 1.24 | 0.982 | 0.997 |
| Slope is negative in the 25-50% strain range (10 mil film, TD) | Yes | Yes | No | No |
| Slope is negative in the 25-30% strain range (1 mil film, TD) | Yes | Yes | No | No |
| Ratio of: Stress @ 50% Strain / Stress @ Yield Strain (10 mil film, TD) | 0.85 | 0.93 | 1.06 | 1.10 |
| Ratio of: Stress @ 30% Strain / Stress @ Yield Strain (1 mil film, TD) | 0.61 | 0.84 | 1.06 | 0.97 |

TABLE IV

Gel Count Comparison for Examples 2 and 5-7

|  | Example 2 | Example 5 | Example 6 | Example 7 |
|---|---|---|---|---|
| Number of gels >200 μm (number per ft$^2$) | 474 | 16 | 78 | 44 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

An ethylene polymer having a ratio of Mw/Mn of less than or equal to about 5, a ratio of Mz/Mw of less than or equal to about 2.3, and a zero-shear viscosity at 190° C. of greater than or equal to about $8 \times 10^4$ Pa-sec.

Embodiment 2

The polymer defined in embodiment 1, wherein the ethylene polymer has a melt index in any range disclosed herein, e.g., from 0 to about 2, from 0 to about 1, from about 0.05 to about 1, from about 0.1 to about 0.8 g/10 min, etc.

Embodiment 3

The polymer defined in any one of embodiments 1-2, wherein the ethylene polymer has a ratio of HLMI/MI in any range disclosed herein, e.g., from about 15 to about 50, from about 20 to about 50, from about 20 to about 45, from about 25 to about 35, etc.

Embodiment 4

The polymer defined in any one of embodiments 1-3, wherein the ethylene polymer has a density in any range disclosed herein, e.g., from about 0.895 to about 0.928, from about 0.90 to about 0.925, from about 0.905 to about 0.925, from about 0.91 to about 0.92 g/cm$^3$, etc.

Embodiment 5

The polymer defined in any one of embodiments 1-4, wherein the ethylene polymer has a zero-shear viscosity at 190° C. in any range disclosed herein, e.g., from about $8 \times 10^4$ to about $2 \times 10^6$, from about $1 \times 10^5$ to about $1 \times 10^6$, from about $1 \times 10^5$ to about $8 \times 10^5$, from about $1 \times 10^5$ to about $5 \times 10^5$ Pa-sec, etc.

Embodiment 6

The polymer defined in any one of embodiments 1-5, wherein the ethylene polymer has a ratio of Mw/Mn in any range disclosed herein, e.g., from about 2 to about 5, from about 2 to about 4, from about 2 to about 3.5, from about 2 to about 3, from about 2.1 to about 2.8, from about 2.1 to about 2.7, etc.

Embodiment 7

The polymer defined in any one of embodiments 1-6, wherein the ethylene polymer has a ratio of Mz/Mw in any range disclosed herein, e.g., from about 1.5 to about 2.3, from about 1.5 to about 2.2, from about 1.5 to about 2.1, from about 1.5 to about 2, etc.

Embodiment 8

The polymer defined in any one of embodiments 1-7, wherein the ethylene polymer has a Mw in any range disclosed herein, e.g., from about 75,000 to about 250,000, from about 85,000 to about 200,000, from about 90,000 to about 150,000, from about 100,000 to about 150,000 g/mol, etc.

Embodiment 9

The polymer defined in any one of embodiments 1-8, wherein the ethylene polymer has a Mn in any range disclosed herein, e.g., from about 10,000 to about 70,000, from about 25,000 to about 70,000, from about 30,000 to about 70,000, from about 35,000 to about 65,000 g/mol, etc.

Embodiment 10

The polymer defined in any one of embodiments 1-9, wherein the ethylene polymer has a Mz in any range disclosed herein, e.g., from about 175,000 to about 300,000, from about 200,000 to about 300,000, from about 210,000 to about 290,000 g/mol, etc.

Embodiment 11

The polymer defined in any one of embodiments 1-10, wherein the ethylene polymer has a reverse comonomer distribution, e.g., the number of short chain branches (SCB's) per 1000 total carbon atoms of the polymer at Mw is greater than at Mn, etc.

Embodiment 12

The polymer defined in any one of embodiments 1-11, wherein the ethylene polymer has a number of long chain branches (LCB) per 1000 total carbon atoms in any range disclosed herein, e.g., from about 0.008 to about 0.04, from about 0.009 to about 0.035, from about 0.01 to about 0.03 LCB, etc.

Embodiment 13

The polymer defined in any one of embodiments 1-12, wherein the ethylene polymer has a peak melting point of less than or equal to about 120° C., e.g., in a range from about 100 to about 120° C., in a range from about 110 to about 120° C., etc.

Embodiment 14

The polymer defined in any one of embodiments 1-13, wherein the ethylene polymer has a vicat softening temperature of greater than or equal to about 95° C., e.g., in a range from about 100 to about 120° C., in a range from about 100 to about 110° C., in a range from about 95 to about 105° C., etc.

Embodiment 15

The polymer defined in any one of embodiments 1-14, wherein the ethylene polymer has a difference between the peak melting point of the polymer and the vicat softening temperature of the polymer of less than or equal to about 20° C., e.g., less than or equal to about 18° C., less than or equal to about 16° C., less than or equal to about 14° C., etc.

Embodiment 16

The polymer defined in any one of embodiments 1-15, wherein the ethylene polymer has a CY-a parameter at 190° C. in any range disclosed herein, e.g., from about 0.08 to about 0.28, from about 0.09 to about 0.25, from about 0.1 to about 0.2, from about 0.1 to about 0.18, etc.

Embodiment 17

The polymer defined in any one of embodiments 1-16, wherein the ethylene polymer is an ethylene/α-olefin copolymer.

Embodiment 18

The polymer defined in any one of embodiments 1-17, wherein the ethylene polymer is an ethylene/1-butene copolymer, an ethylene/1-hexene copolymer, or an ethylene/1-octene copolymer.

Embodiment 19

The polymer defined in any one of embodiments 1-18, wherein the ethylene polymer is an ethylene/1-hexene copolymer.

Embodiment 20

The polymer defined in any one of embodiments 1-19, wherein the ethylene polymer is produced by a process comprising contacting a base resin with a peroxide compound at a temperature sufficient to generate peroxide groups at 10-50 ppm of peroxide groups based on the weight of the base resin.

Embodiment 21

The polymer defined in embodiment 20, wherein the step of contacting the base resin with the peroxide compound comprises melt processing a blend (or mixture) of the base resin and the peroxide compound at any melt processing temperature disclosed herein, e.g., in a range from about 120 to about 300° C., in a range from about 150 to about 250° C., in a range from about 175 to about 225° C., etc.

Embodiment 22

The polymer defined in embodiment 21, wherein the melt processing is performed in a twin screw extrusion system.

Embodiment 23

The polymer defined in embodiment 21, wherein the melt processing is performed in a single screw extrusion system.

Embodiment 24

The polymer defined in any one of embodiments 20-23, wherein the base resin has a melt index in any range disclosed herein, e.g., from 0 to about 5, from about 0.25 to about 2, from about 0.5 to about 2.5, from about 0.5 to about 2 g/10 min, etc.

Embodiment 25

The polymer defined in any one of embodiments 20-24, wherein the base resin has a ratio of HLMI/MI in any range disclosed herein, e.g., from about 10 to about 35, from about 10 to about 30, from about 10 to about 25, from about 15 to about 30, etc.

Embodiment 26

The polymer defined in any one of embodiments 20-25, wherein the base resin has a density in any range disclosed herein, e.g., from about 0.895 to about 0.928, from about 0.90 to about 0.925, from about 0.905 to about 0.925, from about 0.91 to about 0.92 g/cm$^3$, etc.

Embodiment 27

The polymer defined in any one of embodiments 20-26, wherein the base resin has a zero-shear viscosity at 190° C. in any range disclosed herein, e.g., from about $2\times10^3$ to about $7\times10^4$, from about $3\times10^3$ to about $5\times10^4$, from about $2\times10^3$ to about $2\times10^4$, from about $3\times10^3$ to about $2\times10^4$ Pa-sec, etc.

Embodiment 28

The polymer defined in any one of embodiments 20-27, wherein the base resin has a ratio of Mw/Mn in any range disclosed herein, e.g., from about 2 to about 5, from about 2 to about 4, from about 2 to about 3.5, from about 2 to about 3, from about 2.1 to about 2.8, from about 2.1 to about 2.7, etc.

Embodiment 29

The polymer defined in any one of embodiments 20-28, wherein the base resin has a ratio of Mz/Mw in any range disclosed herein, e.g., from about 1.5 to about 2.3, from about 1.5 to about 2.2, from about 1.5 to about 2.1, from about 1.5 to about 2, etc.

Embodiment 30

The polymer defined in any one of embodiments 20-29, wherein the base resin has a Mw in any range disclosed herein, e.g., from about 75,000 to about 250,000, from about 85,000 to about 200,000, from about 90,000 to about 150,000, from about 100,000 to about 150,000 g/mol, etc.

Embodiment 31

The polymer defined in any one of embodiments 20-30, wherein the base resin has a Mn in any range disclosed herein, e.g., from about 10,000 to about 70,000, from about 25,000 to about 70,000, from about 30,000 to about 70,000, from about 35,000 to about 65,000 g/mol, etc.

Embodiment 32

The polymer defined in any one of embodiments 20-31, wherein the base resin has a Mz in any range disclosed herein, e.g., from about 165,000 to about 300,000, from about 175,000 to about 300,000, from about 200,000 to about 290,000 g/mol, etc.

Embodiment 33

The polymer defined in any one of embodiments 20-32, wherein the base resin has a reverse comonomer distribution, e.g., the number of short chain branches (SCB's) per 1000 total carbon atoms of the polymer at Mw is greater than at Mn, etc.

Embodiment 34

The polymer defined in any one of embodiments 20-33, wherein the base resin has less than about 0.008 long chain branches (LCB) per 1000 total carbon atoms, e.g., less than about 0.005 LCB, less than about 0.003 LCB, etc.

Embodiment 35

The polymer defined in any one of embodiments 20-34, wherein the base resin has a peak melting point of less than or equal to about 120° C., e.g., in a range from about 100 to about 120° C., in a range from about 110 to about 120° C., etc.

Embodiment 36

The polymer defined in any one of embodiments 20-35, wherein the base resin has a vicat softening temperature of greater than or equal to about 95° C., e.g., in a range from about 100 to about 120° C., in a range from about 100 to about 110° C., in a range from about 95 to about 105° C., etc.

Embodiment 37

The polymer defined in any one of embodiments 20-36, wherein the base resin has a difference between the peak melting point of the base resin and the vicat softening temperature of the base resin of less than or equal to about 20° C., e.g., less than or equal to about 18° C., less than or equal to about 16° C., less than or equal to about 14° C., etc.

Embodiment 38

The polymer defined in any one of embodiments 20-37, wherein the base resin has a CY-a parameter at 190° C. in any range disclosed herein, e.g., from about 0.4 to about 0.8, from about 0.5 to about 0.8, from about 0.4 to about 0.7, from about 0.5 to about 0.7, etc.

Embodiment 39

The polymer defined in any one of embodiments 20-38, wherein the base resin is produced using a metallocene-based catalyst system.

Embodiment 40

The polymer defined in any one of embodiments 20-39, wherein the base resin is produced using a metallocene-based catalyst system comprising a metallocene compound and an activator, e.g., any metallocene compound and any activator disclosed herein.

Embodiment 41

The polymer defined in embodiment 40, wherein the activator comprises an activator-support, an aluminoxane compound, an organoboron or organoborate compound, an ionizing ionic compound, or any combination thereof.

Embodiment 42

The polymer defined in any one of embodiments 40-41, wherein the activator comprises an activator-support, the activator-support comprising a solid oxide treated with an electron-withdrawing anion.

Embodiment 43

The polymer defined in any one of embodiments 40-41, wherein the activator comprises an aluminoxane compound.

Embodiment 44

The polymer defined in any one of embodiments 40-43, wherein the metallocene-based catalyst system further comprises a co-catalyst.

Embodiment 45

The polymer defined in any one of embodiments 40-44, wherein the metallocene-based catalyst system further comprises an organoaluminum co-catalyst.

Embodiment 46

The polymer defined in any one of embodiments 20-45, wherein the base resin is produced in any reactor disclosed herein, e.g., a slurry reactor, a gas-phase reactor, a solution reactor, etc., as well as multi-reactor combinations thereof.

Embodiment 47

An article of manufacture comprising the ethylene polymer defined in any one of embodiments 1-46.

Embodiment 48

A film comprising the ethylene polymer defined in any one of embodiments 1-47, e.g. a blown film, a cast film, etc.

Embodiment 49

A film comprising the ethylene polymer defined in any one of embodiments 1-47 and at least one additive.

Embodiment 50

The film defined in embodiment 49, wherein the additive comprises an antioxidant, acid scavenger, antiblock additive, slip additive, colorant, filler, processing aid, UV inhibitor, or any combination thereof.

Embodiment 51

A method of making a film (e.g., a blown film, a cast film, etc.) comprising an ethylene polymer, the method comprising:
(i) providing an ethylene polymer defined in any one of embodiments 1-46; and
(ii) melt processing the ethylene polymer through a film die (e.g., a blown film die, a cast film die, etc.) to form the film.

Embodiment 52

The method defined in embodiment 51, wherein the method comprises melt processing the ethylene polymer and at least one additive through the die.

Embodiment 53

The method defined in embodiment 52, wherein the additive comprises an antioxidant, acid scavenger, antiblock additive, slip additive, colorant, filler, processing aid, UV inhibitor, or any combination thereof.

Embodiment 54

The method defined in any one of embodiments 51-53, wherein the ethylene polymer is produced by a process comprising contacting any base resin disclosed herein with a peroxide compound at a temperature sufficient to generate peroxide groups at 10-50 ppm of peroxide groups based on the weight of the base resin.

Embodiment 55

The method defined in embodiment 54, wherein the step of contacting the base resin with the peroxide compound comprises melt processing a blend (or mixture) of the base resin and the peroxide compound at any melt processing temperature disclosed herein, e.g., in a range from about 120 to about 300° C., in a range from about 150 to about 250° C., in a range from about 175 to about 225° C., etc.

Embodiment 56

A film formed by the method defined in any one of embodiments 51-55, e.g., a blown film, a cast film, etc.

Embodiment 57

The film or method defined in any one of embodiments 48-56, wherein the film has a thickness in any range disclosed herein, e.g., from about 1 to about 200 mils, from about 10 to about 200 mils, from about 30 to about 120 mils, from about 40 to about 100 mils, etc.

Embodiment 58

The film or method defined in any one of embodiments 48-57, wherein, in a stress versus strain curve in the transverse direction (TD) for a 10-mil film (e.g., a blown film, a cast film), a ratio of the maximum stress at a strain of less than 40% to the maximum stress at a strain in the 40% to 60% range is in any range of ratios disclosed herein, e.g., less than or equal to 1, less than or equal to about 0.99, less than or equal to about 0.98, from about 0.85 to 1, from about 0.9 to about 0.99, from about 0.9 to about 0.98, etc.

Embodiment 59

The film or method defined in any one of embodiments 48-58, wherein, in a stress versus strain curve in the transverse direction (TD) for a 1-mil film (e.g., a blown film, a cast film), a ratio of the maximum stress at a strain of less than 40% to the maximum stress at a strain in the 40% to 60% range is in any range of ratios disclosed herein, e.g., less than or equal to 1.1, less than or equal to about 1, less than or equal to about 0.99, less than or equal to about 0.98, from about 0.85 to 1.1, from about 0.9 to about 1, from about 0.9 to about 0.99, etc.

Embodiment 60

The film or method defined in any one of embodiments 48-59, wherein, in a stress versus strain curve in the transverse direction (TD) for a 10-mil film, the slope is not negative in the 25% to 50% strain range, and/or in a stress versus strain curve in the transverse direction (TD) for a 1-mil film, the slope is not negative in the 25% to 30% strain range.

Embodiment 61

The film or method defined in any one of embodiments 48-60, wherein, in a stress versus strain curve in the transverse direction (TD) for a 10-mil film, the stress at 50% strain is greater than the stress at the yield point.

Embodiment 62

The film or method defined in any one of embodiments 48-61, wherein, in a stress versus strain curve in the transverse direction (TD) for a 1-mil film, a ratio of the stress at a strain of 30% to the stress at the yield point is in any range of ratios disclosed herein, e.g., greater than or equal to 0.9, greater than or equal to about 0.95, in a range from 0.9 to about 1.2, in a range from 0.9 to about 1.1, in a range from about 0.95 to about 1.2, in a range from about 0.95 to about 1.1, etc.

Embodiment 63

The film or method defined in any one of embodiments 48-62, wherein the film is a blown film.

Embodiment 64

The film or method defined in any one of embodiments 48-62, wherein the film is a cast film.

The invention claimed is:

1. A method of making a film comprising an ethylene polymer, the method comprising:
   (i) providing an ethylene polymer having a ratio of Mw/Mn of less than or equal to about 5, a ratio of Mz/Mw of less than or equal to about 2.3, and a zero-shear viscosity at 190° C. of greater than or equal to about $1 \times 10^5$ Pa-sec;
   wherein the ethylene polymer is further characterized by a peak melting point in a range from about 100 to about 120° C., a vicat softening temperature in a range from about 95 to about 110° C., and a difference between the peak melting point and the vicat softening temperature of less than or equal to about 16° C.; and
   (ii) melt processing the ethylene polymer through a film die to form the film.

2. The method of claim 1, wherein:
   the method comprises melt processing the ethylene polymer and at least one additive through the die; and
   the ethylene polymer is an ethylene/α-olefin copolymer.

3. The method of claim 2, wherein the film is a blown film.

4. The method of claim 3, wherein the ethylene/α-olefin copolymer is produced by a process comprising melt processing a mixture of a base resin and a peroxide compound in a twin screw extrusion system at a temperature in a range from about 120 to about 300° C. to generate peroxide groups at about 10-50 ppm of peroxide groups based on the weight of the base resin.

5. The method of claim 1, wherein the ethylene polymer is further characterized by:
   a melt index in a range from about 0.05 to about 2;
   a ratio of HLMI/MI in a range from about 15 to about 50; and
   a density in a range from about 0.895 to about 0.928 g/cm³.

6. The method of claim 1, wherein:
   the ratio of Mw/Mn is in a range from about 2 to about 5; and
   the ratio of Mz/Mw is in a range from about 1.5 to about 2.3.

7. The method of claim 6, wherein the zero-shear viscosity at 190° C. is in a range from about $1 \times 10^5$ to about $2 \times 10^6$ Pa-sec.

8. The method of claim 7, wherein the film is a blown film or a cast film, and is characterized by a thickness in a range from about 0.5 to about 250 mils.

9. The blown film or cast film prepared by the method of claim 8.

10. A method of making a film comprising an ethylene/α-olefin copolymer, the method comprising:
    (i) providing an ethylene/α-olefin copolymer having:
        a ratio of Mw/Mn in a range from about 2 to about 4;
        a ratio of Mz/Mw in a range from about 1.5 to about 2.2;
        a melt index in a range from 0 to about 1;
        a zero-shear viscosity at 190° C. of greater than or equal to about $1 \times 10^5$ Pa-sec;
        a density in a range from about 0.91 to about 0.92 g/cm³; and
        from about 0.008 to about 0.04 long chain branches (LCB) per 1000 total carbon atoms; and
    (ii) melt processing the ethylene/α-olefin copolymer through a film die to form the film.

11. The method of claim 10, wherein the copolymer is further characterized by:
    a peak melting point in a range from about 105 to about 120° C.; and
    a vicat softening temperature in a range from about 95 to about 110° C.

12. The method of claim 10, wherein the copolymer is further characterized by a CY-a parameter at 190° C. in a range from about 0.08 to about 0.28.

13. The method of claim 10, wherein:
    the ethylene/α-olefin copolymer is produced by a process comprising melt processing a mixture of a base resin and a peroxide compound at a weight ratio of peroxide groups of the peroxide compound in a range from about 10 to about 60 ppm, based on the weight of the base resin; and
    step (ii) comprises melt processing the ethylene/α-olefin copolymer and at least one additive through the film die to form the film.

14. The method of claim 10, wherein the film is a blown film or a cast film, and is characterized by a thickness in a range from about 0.5 to about 250 mils.

15. The blown film or cast film prepared by the method of claim 14.

16. A method of making a film comprising an ethylene/1-hexene copolymer, the method comprising:
    (i) providing an ethylene/1-hexene copolymer having:
        a ratio of Mw/Mn of less than or equal to about 5;
        a ratio of Mz/Mw of less than or equal to about 2.3;
        a zero-shear viscosity at 190° C. of greater than or equal to about $1 \times 10^5$ Pa-sec;
        a CY-a parameter at 190° C. in a range from about 0.08 to about 0.28; and
        a density in a range from about 0.905 to about 0.925 g/cm³; and
    (ii) melt processing the ethylene/1-hexene copolymer through a film die to form the film.

17. The method of claim 16, wherein:
    the ratio of Mw/Mn is in a range from about 2 to about 3.5; and
    the ratio of Mz/Mw is in a range from about 1.5 to about 2.2.

18. The method of claim 17, wherein:
    the CY-a parameter at 190° C. is in a range from about 0.08 to about 0.18; or
    the zero-shear viscosity at 190° C. is in a range from about $1 \times 10^5$ to about $2 \times 10^6$ Pa-sec; or
    both.

19. The method of claim 17, wherein the film is a blown film or a cast film, and is characterized by a thickness in a range from about 0.5 to about 250 mils.

20. The blown film or cast film prepared by the method of claim 19.

21. A method of making a film comprising an ethylene/α-olefin copolymer, the method comprising:
    (i) providing an ethylene/α-olefin copolymer having a ratio of Mw/Mn of less than or equal to about 5, a ratio of Mz/Mw of less than or equal to about 2.3, and a zero-shear viscosity at 190° C. of greater than or equal to about $1 \times 10^5$ Pa-sec;
    wherein the ethylene/α-olefin copolymer is further characterized by a CY-a parameter at 190° C. in a range from about 0.08 to about 0.28, or from about 0.008 to about 0.04 long chain branches (LCB) per 1000 total carbon atoms, or both, and a density in a range from about 0.895 to about 0.928 g/cm³, and
    (ii) melt processing the ethylene/α-olefin copolymer through a film die to form the film.

22. The method of claim 21, wherein:
the ratio of Mw/Mn is in a range from about 2 to about 5;
the ratio of Mz/Mw is in a range from about 1.5 to about 2.3; and
the zero-shear viscosity at 190° C. is in a range from about $1 \times 10^5$ to about $2 \times 10^6$ Pa-sec.

23. The method of claim 22, wherein the ethylene/α-olefin copolymer is further characterized by:
a melt index in a range from about 0.05 to about 2; and
a ratio of HLMI/MI in a range from about 15 to about 50.

24. The method of claim 22, wherein the film is a blown film or a cast film, and is characterized by a thickness in a range from about 0.5 to about 250 mils.

25. The blown film or cast film prepared by the method of claim 24.

* * * * *